(12) United States Patent
Erimli

(10) Patent No.: US 6,711,161 B1
(45) Date of Patent: Mar. 23, 2004

(54) ARRANGEMENT FOR PROVIDING LINEARLY SCALEABLE ADDRESS FORWARDING TABLES WITHIN MULTIPLE NETWORK SWITCH MODULES

(75) Inventor: Bahadir Erimli, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/512,590

(22) Filed: Feb. 24, 2000

(51) Int. Cl.[7] .......................... H04L 12/50; H04Q 11/00
(52) U.S. Cl. ..................... 370/360; 370/395.2; 370/400
(58) Field of Search ................................. 370/386–389, 370/412, 429, 360, 237, 395.2, 395.3, 397, 401, 400; 709/238, 242

(56) References Cited

U.S. PATENT DOCUMENTS

| | | | |
|---|---|---|---|
| 5,953,335 A | 9/1999 | Erimli et al. | |
| 6,233,242 B1 * | 5/2001 | Mayer et al. | 370/412 |
| 6,456,597 B1 * | 9/2002 | Bare | 370/252 |
| 6,490,276 B1 * | 12/2002 | Salett et al. | 370/360 |

OTHER PUBLICATIONS

US2002/0054595A1, Ambe et al., May 9, 2002; Mirroring in a stacked network switch configuration.*

* cited by examiner

Primary Examiner—Wellington Chin
Assistant Examiner—Yvonne Q. Ha
(74) Attorney, Agent, or Firm—Manelli Denison & Selter PLLC; Leon R. Turkevich

(57) ABSTRACT

A network switching system having a plurality of multiport switch modules arranged in a cascaded sequence uses a signaling protocol that eliminates the necessity of storing a given network address within each of the address forwarding tables of the multiport switch modules. A network switch module, having an address forwarding table for storing switching information for respective stored network addresses and that receives a data packet, outputs a switching request to a subsequent one of the switch modules based on a determined absence of the destination address of the received data packet in the address forwarding table. Each of the successive network switch modules passes the switching request to the next switch module in the sequence upon a determined absence of the destination address in the corresponding address forwarding table. The switching request identifies the originating network switch module having received the data packet, enabling the network switch module having the last position in the cascaded sequence relative to the originating network switch module to generate a flood signal to all the network switch modules if none of the network switch modules have the destination address in their respective address forwarding tables. Hence, the multiport switch modules can be arranged in a cascaded sequence to provide increased port density, without the necessity of unnecessarily populating the address forwarding tables with each and every network address detected by any one of the network switch modules.

16 Claims, 3 Drawing Sheets

ARRANGEMENT FOR PROVIDING LINEARLY SCALEABLE ADDRESS FORWARDING TABLES WITHIN MULTIPLE NETWORK SWITCH MODULES

BACKGROUND OF THE INVENTION

1. Field of the Invention

The present invention relates to arrangements for switching data packets in switched local area networks, in particular to arrangements for cascading multiple multiport network switches to increase the number of ports in a network switching arrangement.

2. Background Art

A multiport network switch in a packet switching network is coupled to stations on the network through its multiple ports. Data sent by one station on a network to one or more other stations on the network are sent through a network switch. For example, commonly-assigned U.S. Pat. No. 5,953,335 discloses a network switch configured for switching layer 2 type Ethernet (IEEE 802.3) data packets between different network nodes. The network switch determines the destination of a received data frame from the data frame header. The network switch then transmits the data frame from the appropriate port to which the destination network station is connected.

A single Ethernet network switch may have a number of 10/100 Mbps ports, equaling, for example, 12 ports. The number of end stations connected to the single network switch is limited by the number of ports (i.e., port density) on the network switch. However, today's users of networking devices demand flexibility and scalability without such constraints. To address this need, manufacturers have developed modular architectures that enable cascading of identical networking devices or network switch modules. By cascading these devices in a loop, port density can be readily increased without redesign or development of costly interfaces.

Unfortunately, an increase in the number of cascaded network switch modules to increase port density does not necessarily result in an increase in the capacity of network addresses that can be stored within the cascaded network switch modules. In particular, each network switch module typically includes an address forwarding table that specifies for a given network address (e.g., a media access control (MAC) address) a network switch port that serves the corresponding network address. Hence, a network switch can determinate a destination output switch port for a received data frame by searching the address forwarding table using the destination MAC address within the received data frame.

In a cascaded arrangement, however, a network switch module that does not have a network switch port that serves a network station having a certain MAC address may have an address table entry for the certain MAC address that specifies an expansion port that connects of the multiple switch modules in the cascaded arrangement. Hence, the address table specifies for the certain MAC address that the data packet should be forwarded to another one of the network switch modules of the cascaded arrangement. The one switch module that serves the network station having the certain MAC address will have within its address forwarding table an address table entry that specifies the certain MAC address and the corresponding destination output port. Hence, at least two address table entries are used to locate a single MAC address.

Consequently, the cascading of multiple network switch modules may increase port density, but results in no increase in the capacity of stored network addresses, since for each added network switch module in the cascaded arrangement, another address table entry is needed for each MAC address specifying whether a received data frame should be output onto the expansion port. Hence, the total capacity of stored network addresses remains limited to the number of address entries that can be stored by any one network switch module. Hence, above-described cascaded arrangement is not scalable as more network switch modules are added.

SUMMARY OF THE INVENTION

There is a need for an arrangement that enables multiple network switch modules to be cascaded for increasing port density, without limiting the number of network devices that may be serviced.

There is also a need for an arrangement that enables multiple network switch modules to be cascaded, without increasing the size of address forwarding tables.

There is also a need for arrangement that enables multiple network switch modules to be cascaded in a manner that provides scalability for port density and memory capacity for address forwarding tables configured for storing switching information for stored network addresses.

These and other needs are attained by the present invention, where a network switching system having a plurality of multiport switch modules arranged in a cascaded sequence uses a signaling protocol that eliminates the necessity of storing a given network address within each of the address forwarding tables of the multiport switch modules. A network switch module, having an address forwarding table for storing switching information for respective stored network addresses and that receives a data packet, outputs a switching request to a subsequent one of the switch modules based on a determined absence of the destination address of the received data packet in the address forwarding table. Each of the successive network switch modules passes the switching request to the next switch module in the sequence upon a determined absence of the destination address in the corresponding address forwarding table. The switching request identifies the originating network switch module having received the data packet, enabling the network switch module having the last position in the cascaded sequence relative to the originating network switch module to generate a flood signal to all the network switch modules if none of the network switch modules have the destination address in their respective address forwarding tables. Hence, the multiport switch modules can be arranged in a cascaded sequence to provide increased port density, without the necessity of unnecessarily populating the address forwarding tables with each and every network address detected by any one of the network switch modules.

One aspect of the present invention provides a method in a network switch module connected in a cascaded sequence with a plurality of other network switch modules. The method includes receiving on a first of network switch ports in the network switch module, from a network medium, a data packet that specifies a source address and a destination address, and selectively adding to an address forwarding table of the network switch module the source address and an identifier of the first network switch port based on a determined absence of the source address in the first address forwarding table. The method also includes outputting a switching request, for switching of the data packet, on a bus to a subsequent one of the other switch modules in the cascaded sequence based on a determined absence of the destination address in the address forwarding table. All the network switch ports are selectively flooded with the data packet in response to a flood signal from a preceding one of the other switch modules in the cascaded sequence. The outputting of the switching request enables each of the other network switch modules to determine the presence of the destination address in their respective address forwarding tables, without unnecessarily populating their address forwarding tables with network addresses having unknown origins. Hence, the duplicate entries of network addresses in multiple address forwarding tables can be eliminated. In addition, the selective flooding in response to a flood signal enables the cascaded network switch modules to attempt to access an unknown destination address without unnecessarily populating the address forwarding tables.

Another aspect of the present invention provides a method in a network switch module connected in a cascaded sequence with a plurality of other network switch modules. The method includes receiving, from a preceding one of the other network switch modules in the cascaded sequence, a switching request having a data frame identifier that specifies at least a destination address for a received data frame and one of the other switch modules having received the received data frame. The method also includes selectively outputting, to a subsequent one of the other switch modules in the cascaded sequence in response to a determined absence of the destination address within an address forwarding table of the network switch module, one of the switching request and a flood signal based on a position of the network switch module in the cascaded sequence relative to the one switch module having received the data frame, the flood signal requesting flooding of all network switch ports of the other network switch ports with the received data frame.

Still another aspect of the present invention provides a network switch module configured for connection with other network switch modules in a cascaded sequence. The network switch module includes a plurality of network switch ports, an address forwarding table configured for storing an address entry having a network address and a network switch port identifier for a network station coupled to one of the network switch ports, and switching logic. The switching logic is configured for determining the presence of the address entry in the address forwarding table for a destination address of a received data frame. In response to a determined absence of the address entry for the received data frame, the switching logic selectively outputs to another one of the switch modules a switching request for the received data frame or a flood signal for outputting the received data frame on all network switch ports, based on a position of the multiport switch module, determined by the switching logic, relative to the one of the multiport switch modules having received the data frame. The network switch module also includes a data bus interface configured for connecting the network switch module with the other network switch modules in the cascaded sequence and transferring the switching request and the flood signal.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
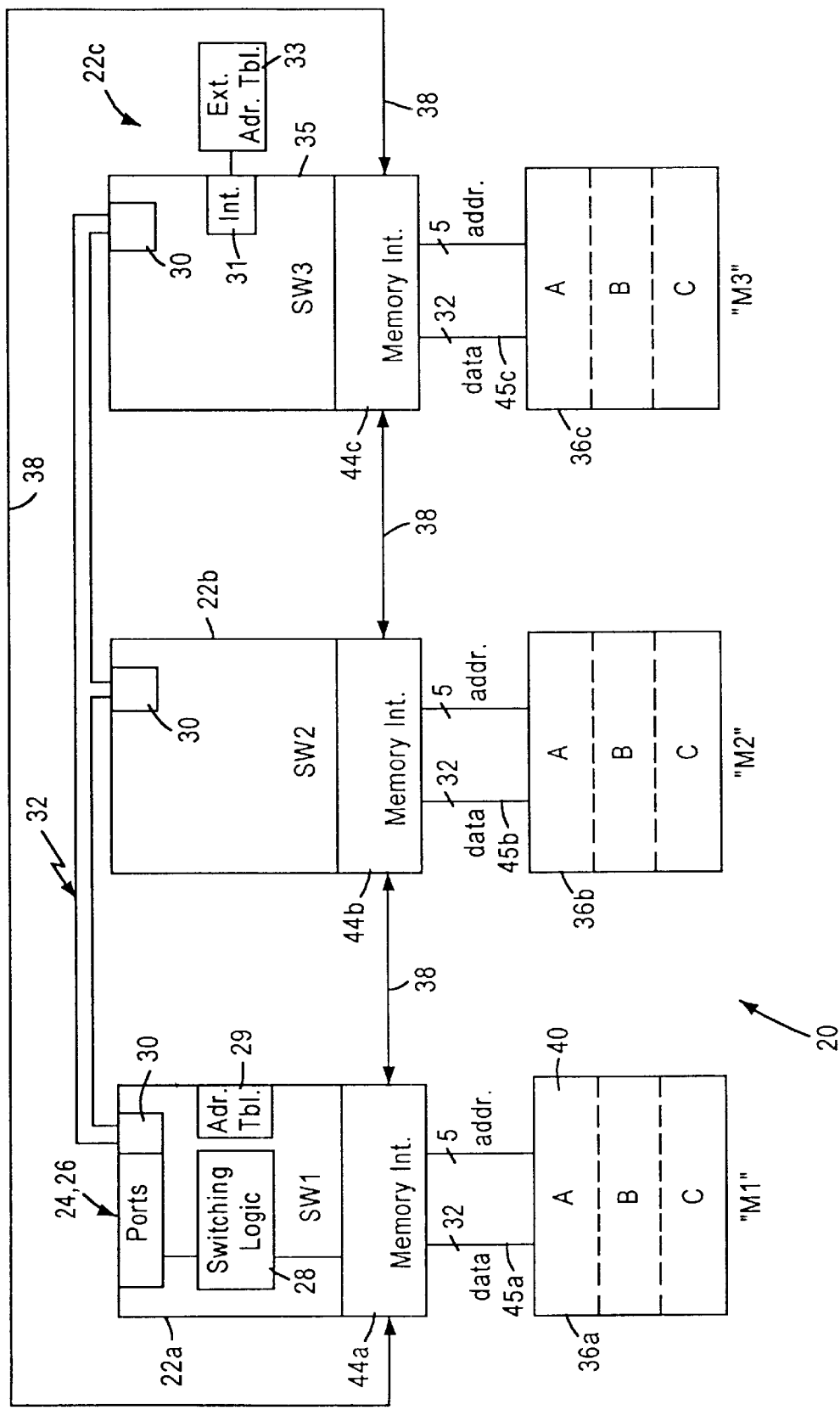
FIG. 1 is a diagram illustrating a conventional (prior art) switching arrangement that cascades multiple switch modules.

FIG. 1 is a block diagram illustrating a network switching system 20 in a packet switched network, such as an Ethernet (IEEE 802.3) network. The network switching system 20 includes multiport switch modules 22 that enable communication of data packets between network stations (not shown) via respective network switch ports 24. The network stations, for example client workstations, are typically configured for sending and receiving data packets at 10 Mbps or 100 Mbps according to IEEE 802.3 protocol. Each of the multiport switch modules 22 may also include a gigabit Ethernet link 26 for transfer of data packets to a server, a gateway to a high-speed backbone network, or the like. The 10/100 Mbps network stations may operate in either half duplex mode or full duplex mode.

The multiport switch modules 22 are arranged in a cascaded sequence and connected by an expansion bus 32, enabling the multiport switch modules 22 to interoperate in the switching operations, described below.

Each of the multiport switch modules 22 also include switching logic 28 configured for switching the data packets received from the network switch ports 24 or 26 using layer 2 switching protocol. In particular, the switching logic 28 has an internal media access control (MAC) address lookup table 29 that stores, for each network station connected to the corresponding multiport switch 22, the MAC address of the network station and the switch port number of the network switch port 24 or 26 servicing that network station. The multiport switch modules 22a and 22b are implemented as integrated chips. The multiport switch module 22 may also be configured for use of an external address table 33 accessible by an integrated multiport switch chip 35, as illustrated with respect to the switching module 22c, wherein the switching module 22c includes an external interface 31 enabling the switching logic 28 of the corresponding switching module 22c to access the external address table 33.

Figure 2A:
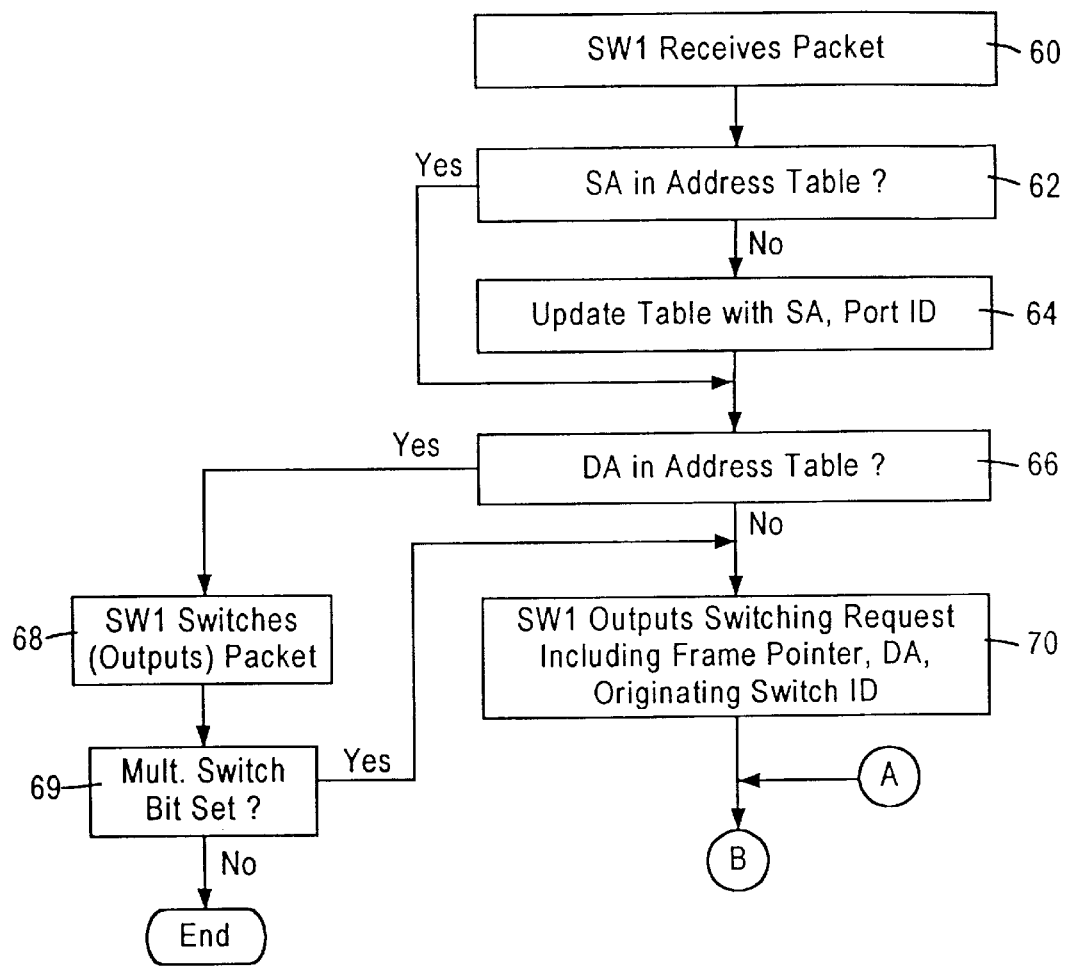
FIGS. 2A and 2B are diagrams summarizing the method of switching a data packet using the cascaded network switch modules of FIG. 1 according to an embodiment of the present invention.
Figure 2B:
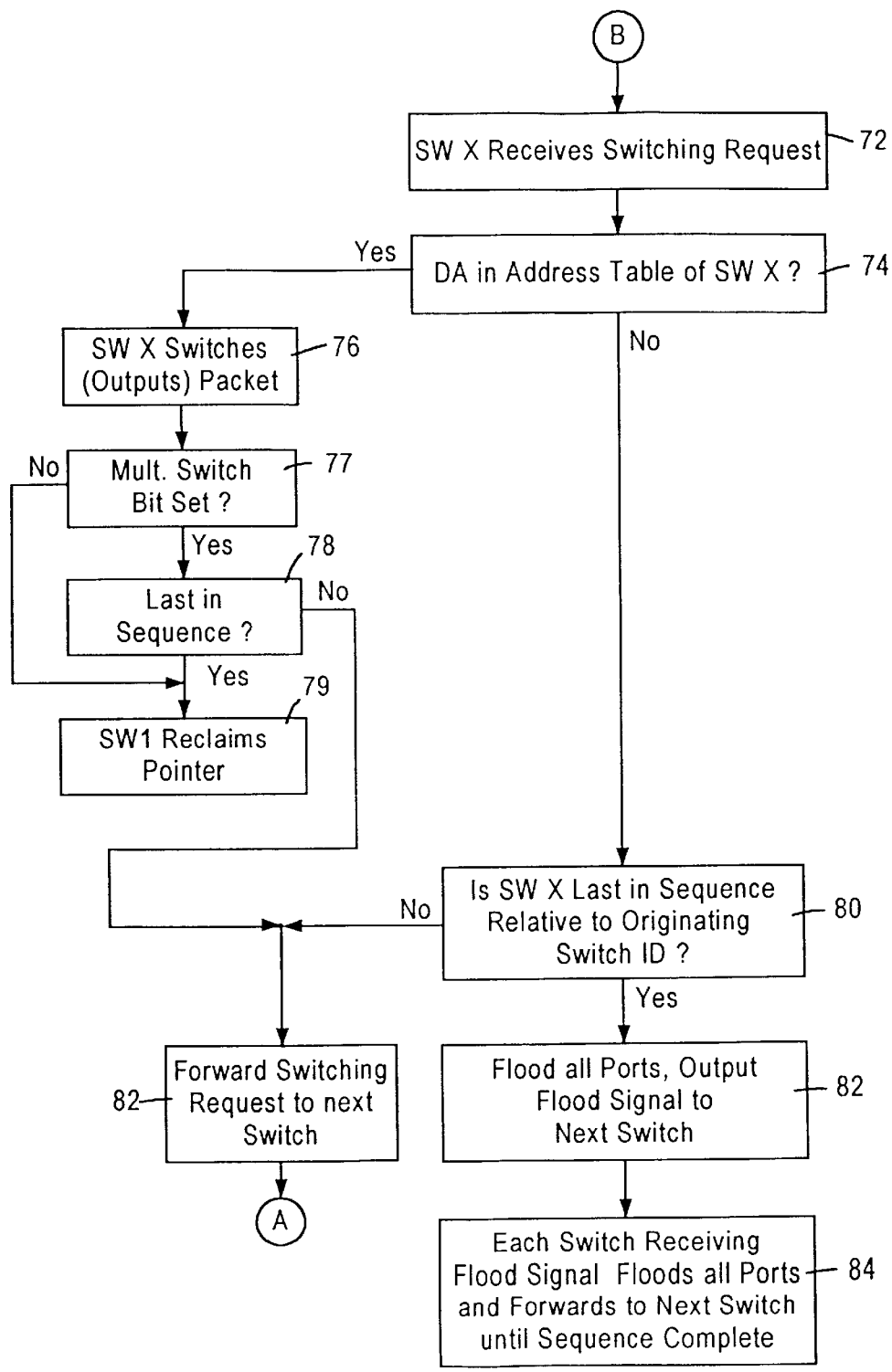

FIGS. 2A and 2B are flow diagrams summarizing the method of switching data packets using the multiport switch modules 22 according to an embodiment of the present invention. The method begins in step 60, where the multiport switch module 22a ("SW1") receives a data packet on one of its network switch ports 24 or 26. The switching logic 28 of the multiport switch module 22a, upon receiving a data frame, will first search the MAC address lookup table 29 in step 62 using the source MAC address in the received data packet to determine whether the MAC address for the transmitting network station having transmitted the data frame is already stored in the MAC address lookup table 29 of the multiport switch module 22a. If in step 62 the switching logic 28 of switch module 22a does not locate the source MAC address in the corresponding MAC address lookup table 29, the switching logic 28 updates in step 64 the MAC address lookup table 29 of switch module 22a with the source MAC addresses and the corresponding switch port number for the network switch port 24 or 26 having received the data packet.

The switching logic 28 then searches in step 66 the MAC address lookup table 29 using the destination MAC address in the received data packet to determine the output port for the received data packet. If the destination MAC address is found in the MAC address lookup table 29, the switch module 22a outputs the data packets in step 68. If the switch module 22a detects within the MAC address lookup table that the multiple switch bit is set, indicating that the data frame should be forwarded to multiple switches, the switch module continues to step 70, described below.

If the destination MAC address is not found in the MAC address lookup table 29, or if in step 69 the multiple switch bit is set, the switching logic 28 outputs in step 70 a switching request to the other multiport switches 22 via an expansion port 30 (i.e., a network switch port configured for transferring a frame pointer to another multiport switch 22) in an effort to locate the destination network station. The switching request includes a frame pointer specifying the location of the received data packet within the shared memory 36, described below, the destination address to be searched, and an identification of the originating switch having received the data frame.

The next switch module 22 (e.g., 22b) in the cascaded sequence receives the switching request from the preceding switch module in the cascaded sequence in step 72. The switching module 22 having received the switching request forwards the switching request to its corresponding switching logic 28; the switching logic 28 (e.g., of switch module 22b) then determines whether the destination address within the switching request is located within the corresponding address forwarding table 29 or 33 in step 74. If the switch module 22 in possession of the switching request (e.g., 22b) locates the destination address in its corresponding address forwarding table, the switching module outputs the data packet in step 76. If in step 77 the switching module determines that the multiple switch bit is set, as described above with respect to step 69, switching module determines in step 78 whether it is the last switching module in the sequence relative to the originating switch identifier. If in step 78 the switching module is the last in the sequence, the switching module returns the frame pointer to the original originating switch 22a for reclaiming the buffer memory location in step 79. Note that the originating switch 22a in step 79 reclaims the frame pointer, resulting in dropping the stored data frame, without updating its corresponding address forwarding table 29 with the destination address. Hence, the switching logic 28 maintains the address forwarding table 29 independent of whether the destination address is located in another one of the other switch modules 22, such that the address table 29 is updated with a network address only if the network address identifies a network node connected to the corresponding switch module 22. If in step 78 the switching module is not the last in the sequence, the frame pointer is forwarded to the next switch in step 82 based on detecting that the multiple switch bit is set in the local address table.

If in step 74 the switch module 22 (e.g., 22b) having possession of the switching request does not locate the destination address in its corresponding address forwarding table 29 (or 33), the switch module 22 (e.g., 22b) then checks in step 80 whether it is the last switch in the cascaded sequence relative to the originating switch identifier (e.g., 22a). If the switch module 22 having possession of the switching request determines that it is not the last switch module in the cascaded sequence, the switch module (e.g. 22b) forwards the switching request to the next switch of the sequence (e.g. 22c) in step 82. The next switch module 22 is then able to repeat the procedure until all the network switch modules in the cascaded sequence have searched for the destination address in their respective address forwarding tables 29 or 33.

If none of the other multiport switches 22 locate the destination station, that all the switch modules 22 flood all the output ports in an attempt to locate the destination station. In particular, assume that the last switch ("SW3") 22c having possession of the switching request determines in step 74 that the destination address is not located in the corresponding address forwarding table 33. Upon detecting in step 80 that it is the last switch in the sequence relative to the originating switch identifier, the last switch module 22c floods all its output ports 24, 26 with the received data packet in step 82, and sends a flood signal to the next switch module 22 in the sequence, instructing the next switch module 22 to flood all of its output ports. Each switch module 22 successively floods all of its output ports in response to receiving the flood signal. Once the flood signal is returned back to the switch module having initiated the flood signal, all of the switch modules 22 of the cascaded sequence have flood all the output ports in an attempt to locate the destination address.

As shown in FIG. 1, the network switching system 20 includes a plurality of buffer memory devices 36 connected to respective multiport switches 22, and a data bus 38 configured for passing frame data between the switch modules 22. The network switch port 22 having received the data packet (e.g., 22a) stores the received data frame using a shared memory arrangement, where a corresponding portion of the data frame is stored in each of the buffer memory devices 36 at the same prescribed location within a memory segment 40 assigned to the corresponding switch module 22.

In particular, each of the switch modules 22 include a memory interface 44 configured for controlling the storage of frame data in the buffer memory devices 36 according to a prescribed protocol. The memory interfaces 44 assign, according to the prescribed protocol, a memory segment 40 in each of the buffer memory devices 36 to a corresponding one of the network switch modules 22. For example, the memory interfaces 44 assign memory segment A in each of the buffer memory devices 36 to the switching module 22a, memory segment B in each of the buffer memory devices 36 to the switching module 22b, and memory segment C in each of the buffer memory devices 36 to the switching module 22c. Hence, the switch module 22a can write frame data only into memory segment A of the buffer memory devices 36a, 36b, and 36c; the switch module 22b can write frame data only into memory segment B of the buffer memory devices 36a, 36b, and 36c; and the switch module 22c can write frame data only into memory segment C of the buffer memory devices 36a, 36b, and 36c.

Hence, any one of the switch modules 22 can store in each of the buffer memory devices 36 a corresponding portion of a data frame at the same prescribed location within its corresponding assigned memory segment. Consequently, each memory interface 44 can use a single frame pointer that specifies a specific memory address location to read frame data for a stored data frame from the memory devices 36. In addition, the memory address location specified in the frame pointer will belong to one of the assigned memory segments A, B, or C, enabling the memory interfaces 44 to identify the originating switch module 22 that stored the frame data; consequently, the memory interfaces 44, upon identifying the originating switch module 22 based on the memory address location specified in the frame pointer, will be able to reconstruct the data frame from the portions stored in the memory devices 36 in the proper sequence that corresponds to the original storage sequence of the originating switch module. Finally, the ability to identify the originating switch module 22 (e.g., 22a) enables the other switch modules (e.g., 22c) to return the frame pointer back to the originating switch module for reclaiming of buffer memory resources after the stored data frame has been transmitted by the switch modules.

The above-described shared memory arrangement is particularly effective in the method described above with respect to FIG. 2, since the memory address specified in the frame pointer also serves to identify the originating network switch module 22; hence, any network switch module 22 can easily determine in step 80 whether it is the last network switch module 22 in the cascaded sequence merely by reviewing the memory address specified in the frame pointer.

According to the disclosed embodiment, network switch modules arranged in a cascaded sequence pass between each other a switching request, for switching of a received data packet, where the network switch modules send to each other a flood signal to flood all output ports if none of the network switch modules can locate a destination address for a received data packet. The passing of a switching request and a flood signal between the network switch modules eliminates the necessity for populating address forwarding tables with remote network addresses of network stations that are located on other switching modules. Hence, a switching module can limit the population of its corresponding address table to only those network nodes directly connected to the switching module, providing scalability in the address tables as multiple switch modules are added in a cascaded sequence.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network switch module connected in a cascaded sequence with a plurality of other network switch modules, the method comprising:
   receiving on a first of network switch ports in the network switch module, from a network medium, a data packet that specifies a source address and a destination address;
   selectively adding to an address forwarding table of the network switch module the source address and an identifier of the first network switch port based on a determined absence of the source address in the first address forwarding table;
   selectively outputting a switching request, for switching of the data packet, on a bus to a subsequent one of the other switch modules in the cascaded sequence based on at least a determined absence of the destination address in the address forwarding table; and
   selectively flooding all the network switch ports with the data packet in response to a flood signal from a preceding one of the other switch modules in the cascaded sequence,
   wherein the address forwarding table is updated with an address identifying a network node only if the network node is connected to one of the network switch ports of the network switch module.

2. The method of claim 1, wherein the selectively adding step includes maintaining the address forwarding table independent of whether the destination address is located in another one of the other switch modules.

3. The method of claim 2, wherein the maintaining step includes dropping the data packet without storing the destination address in the address forwarding table, following the selectively flooding step, independent of whether the destination address is located in another one of the other switch modules.

4. The method of claim 1, wherein the selectively outputting step includes outputting the switching request based on one of the determined absence and a detection of an entry in the address forwarding table specifying the destination address and a corresponding set multiple switch bit, the set multiple switch bit indicating that the data packet be output by at least another one of the other network switch modules.

5. A method in a network switch module connected in a cascaded sequence with a plurality of other network switch modules, the method comprising:
   receiving, from a preceding one of the other network switch modules in the cascaded sequence, a switching request having a data frame identifier that specifies at least a destination address for a received data frame and one of the other switch modules having received the received data frame; and
   selectively outputting, to a subsequent one of the other switch modules in the cascaded sequence based at least on a determined absence of the destination address within an address forwarding table of the network switch module, one of the switching request and a flood signal based on a position of the network switch module in the cascaded sequence relative to the one switch module having received the data frame, the flood signal requesting flooding of all network switch ports of the other network switch ports with the received data frame,
   wherein the address forwarding table of the network switch module is updated with an address identifying a network node only if the network node is connected to one of the network switch ports of the network switch module.

6. The method of claim 5, further comprising selectively flooding all the network switch ports of the network switch module based on the outputting of the flood signal.

7. The method of claim 5, further comprising selectively outputting the data frame on an identified network switch port based on a determined presence of the destination address in the address forwarding table.

8. The method of claim 5, wherein the selectively outputting step includes outputting the switching request based on one of the determined absence and a detection of an entry in the address forwarding table specifying the destination address and a corresponding set multiple switch bit, the set multiple switch bit indicating that the data packet be output by at least another one of the other network switch modules.

9. A method in a network switching system having a plurality of network switch modules arranged in a cascaded sequence, the method comprising:
   receiving by a first of the network switch modules a data packet that specifies a source address and a destination address;
   determining by the first of the network switch modules whether the destination address is stored within an address forwarding table of the first of the network switch modules, and outputting a switching request for switching of the data packet to a subsequent one of the other switch modules in the cascaded sequence based on a determined absence of the destination address in the corresponding address forwarding table;

successively determining by each of the other network switch modules within the cascaded sequence whether the destination address is stored within the corresponding address forwarding table by successively receiving the switching request; and selectively generating a flood signal, specifying outputting the data packet on all network switch ports of all the network switch modules, by one of the other network switch modules based on a determined last position within the cascaded sequence relative to the first of the network switch modules and in response to a determined absence of the destination address in the corresponding address forwarding table, wherein each network switch module updates its corresponding address forwarding table with an address identifying a network node only if the network node is connected to said each network switch module.

10. A network switching system comprising:

at least first and second multiport switch modules arranged in a cascaded sequence, each comprising:

an address forwarding table configured for storing an address entry having a network address and a network switch port identifier for a network station coupled to the corresponding multiport switch module, and switching logic configured for determining the presence of the address entry in the address forwarding table for a destination address of a received data frame, wherein in response to a determined absence of the address entry for the received data frame, the switching logic selectively outputs to another one of the switch modules one of a switching request for the received data frame and a flood signal for outputting the received data frame on all network switch ports, based on a position of the corresponding multiport switch module relative to the one of the multiport switch modules having received the data frame, the switching logic configured for adding to the corresponding address forwarding table an address entry for an identified network station only if the identified network station is connected to the corresponding multiport switch module; and a data bus configured in the cascaded sequence for supplying the switching request and the flood signal between the multiport switch modules.

11. The system of claim 10, further comprising in each of the multiport switch modules a plurality of network switch ports, wherein each switching logic outputs the received data frame on all the corresponding network switch ports in response to reception of the flood signal from another one of the multiport switch modules.

12. The system of claim 10, further comprising in each of the network switch modules an external table interface configured for accessing the address forwarding table, the external table interface and the corresponding switching logic being implemented in a first integrated chip and the address forwarding table being stored on a second integrated chip.

13. A network switch module configured for connection with other network switch modules in a cascaded sequence, the network switch module comprising:

a plurality of network switch ports;

an address forwarding table configured for storing an address entry having a network address and a network switch port identifier for a network station coupled to one of the network switch ports;

switching logic configured for determining the presence of the address entry in the address forwarding table for a destination address of a received data frame, wherein in response to a determined absence of the address entry for the received data frame, the switching logic selectively outputs to another one of the switch modules one of a switching request for the received data frame and a flood signal for outputting the received data frame on all network switch ports, based on a position of the multiport switch module, determined by the switching logic, relative to the one of the multiport switch modules having received the data frame, the switching logic configured for adding to the address forwarding table an address entry for an identified network station only if the identified network station is connected to the network switch module; and a data bus interface configured for connecting the network switch module with the other network switch modules in the cascaded sequence and transferring the switching request and the flood signal.

14. The apparatus of claim 13, wherein the switching logic outputs the received data frame on all the network switch ports in response to reception of the flood signal from one of the other network switch modules.

15. The system of claim 14, further comprising an external table interface configured for accessing the address forwarding table, the external table interface and the corresponding switching logic being implemented in a first integrated chip and the address forwarding table being stored on a second integrated chip.

16. The system of claim 13, wherein the switching logic outputs the switching request to the another one of the switch modules in response to a determined presence of the address entry for the destination address that specifies outputting the received data frame by another one of the switch modules.

* * * * *